US010890956B1

(12) United States Patent
Henderson (10) Patent No.: US 10,890,956 B1
(45) Date of Patent: Jan. 12, 2021

(54) SYSTEM AND METHOD FOR VERSATILE DEVICE MOUNTING IN A DESKTOP INFORMATION HANDLING SYSTEM (71) Applicant: Dell Products L.P., Round Rock, TX (US)

(72) Inventor: Gregory Lane Henderson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/581,972

(22) Filed: Sep. 25, 2019

(51) Int. Cl.
*G06F 1/20* (2006.01)
*G06F 1/18* (2006.01)

(52) U.S. Cl.
CPC .............. *G06F 1/206* (2013.01); *G06F 1/181* (2013.01); *G06F 2200/201* (2013.01)

(58) Field of Classification Search
CPC . G06F 1/20; G06F 1/203; G06F 1/206; G06F 1/181; G06F 2200/201; G06F 1/187; H05K 7/20409; H05K 7/20418; H05K 7/20009–202; H05K 7/20554–20572; H05K 7/20718–20736; G11B 33/00
USPC ........................................ 361/679.46, 679.54
See application file for complete search history.

(56) References Cited

U.S. PATENT DOCUMENTS

| | | | | |
|---|---|---|---|---|
| 5,884,988 A * | 3/1999 | Foo | .......................... | G06F 1/181 312/223.2 |
| 6,222,725 B1 * | 4/2001 | Jo | .......................... | G06F 1/183 361/679.23 |
| 6,381,131 B1 * | 4/2002 | Liu | .......................... | G06F 1/181 360/99.15 |
| 6,728,099 B1 * | 4/2004 | Tsang | .................. | H05K 7/20727 361/678 |
| 8,737,060 B2 * | 5/2014 | Sun | .......................... | G06F 1/20 361/679.49 |
| 2001/0046118 A1 * | 11/2001 | Yamanashi | ............... | G06F 1/20 361/679.33 |
| 2003/0156385 A1 * | 8/2003 | Askeland | ................ | G06F 1/182 361/679.51 |
| 2004/0001308 A1 * | 1/2004 | Yang | ....................... | G06F 1/187 361/679.33 |
| 2004/0233619 A1 * | 11/2004 | Heistand, II | ............ | G06F 1/184 361/679.57 |
| 2005/0128696 A1 * | 6/2005 | Wu | .......................... | G06F 1/187 361/679.33 |
| 2011/0248612 A1 * | 10/2011 | Peng | .................. | H05K 7/20727 312/326 |
| 2012/0327586 A1 * | 12/2012 | Sun | .......................... | G06F 1/20 361/679.33 |
| 2012/0327589 A1 * | 12/2012 | Sun | .......................... | G06F 1/20 361/679.47 |

(Continued)

*Primary Examiner* — Stephen S Sul
(74) *Attorney, Agent, or Firm* — Baker Botts L.L.P.

(57) ABSTRACT

A system for cooling a device while obscuring the device behind a bezel mounted to a front panel of a case of an information handling system. A bracket is configured for selective positioning in any of a plurality of locations and a plurality of orientations. The bracket is configured with a first plurality of openings formed in two or more arrays, the case comprises a second plurality of openings in an array and the bezel has a third plurality of openings. The openings are configured such that when the bracket is mounted in the case and a bezel is positioned on the case, the device is obscured without interfering with cooling the device.

16 Claims, 9 Drawing Sheets

(56) References Cited

U.S. PATENT DOCUMENTS

| | | | | |
|---|---|---|---|---|
| 2014/0375187 A1* | 12/2014 | Li | ............................ | G06F 1/181 |
| | | | | 312/223.2 |
| 2016/0128237 A1* | 5/2016 | Szeremeta | ............ | G11B 33/142 |
| | | | | 361/679.31 |
| 2016/0224073 A1* | 8/2016 | Chen | ..................... | H05K 5/0221 |

* cited by examiner

SYSTEM AND METHOD FOR VERSATILE DEVICE MOUNTING IN A DESKTOP INFORMATION HANDLING SYSTEM

BACKGROUND

Field of the Disclosure

This disclosure relates generally to information handling systems and, more particularly, to information handling systems and methods for mounting devices in different locations and configurations in a desktop information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

As the demand for variations of information handling systems continues to increase, manufacturers are building systems with specific configurations, with each configuration having advantages and drawbacks. For example, chassis designs with device bays mounted on a rotating wall space can minimize the overall size of the system but increase the cost to manufacture. In contrast, chassis designs can be manufactured with fixed bays at a reduced cost, but chassis size increases. Complicating these variations is the continuing need to provide adequate cooling for components inside the case. The components may be purchased from multiple vendors, resulting in variations in power requirements, heat generated, cable routing and other manufacturing issues to be resolved. Components also may have different appearances, with one vendor painting a component, another vendor not painting the component, and even others applying labels or emblems. For a manufacturer wanting to offer a line of information handling system all having the same general appearance and functionality, these variations can result in a product that can look or function differently depending on what vendor or vendors were used at the time of production.

Embodiments are generally directed to a system for cooling a device while obscuring the device behind a bezel mounted to a case of an information handling system, wherein the bezel comprises an open design defined by a first plurality of openings to facilitate convective heat transfer from the case to an ambient environment. The system comprises a front panel of the case having a second plurality of openings formed in an array relative to a heat source, wherein each opening facilitates convective heat transfer from the case; and a bracket comprising a third plurality of openings formed in two or more arrays, wherein an area defined by the two or more arrays is less than an area of the device, wherein each opening is formed in the bracket to facilitate convective heat transfer from the device. The bracket is positioned relative to the front panel such that a portion of the area of the device less than the total area of the device is visible through the third plurality of openings in the bracket, the second plurality of openings in the front panel, and the first plurality of openings in the bezel. The third plurality of openings in the bracket, the second plurality of openings in the front panel of the case and the first plurality of openings in the bezel facilitate convective heat transfer from the device to the ambient environment. In some embodiments, the two or more arrays of openings in the bracket comprise a first array dimensioned with a first set of rows and a first set of columns and a second array dimensioned with a second set of rows and a second set of columns, wherein the dimensions of the first array differ from the dimensions of the second array. In some embodiments, the bracket is selectively positioned relative to the case in one of at least two orientations, wherein in a first orientation, the two or more arrays are positioned relative to a first portion of the second plurality of openings in the case, wherein in a second orientation, the two or more arrays are positioned relative to a second portion of the second plurality of openings in the case. In some embodiments, the orientation of the bracket is based on a label on a device installed in the bracket, wherein the label is less visible when the bracket is positioned in the case in the first orientation than the second orientation. In some embodiments, each opening in the second plurality of openings in the case is dimensioned with a height and a width and each opening in the third plurality of openings in the bracket is dimensioned with a height and a width, wherein the dimensions of the second plurality of openings and the dimensions of the third plurality of openings are based on a distance between the bracket and the front panel. In some embodiments, each pair of openings in the first plurality of openings on the bezel is separated by a rib, wherein a depth of the rib is greater than a width of each opening in the pair of openings. In some embodiments, each opening in the second plurality of openings in the case is dimensioned with a height and a width and each opening in the third plurality of openings in the bracket is dimensioned with a height and a width, wherein the dimensions of the second plurality of openings and the dimensions of the third plurality of openings is based on the depth of the rib and the width of each opening in the bezel. In some embodiments, each rib is angled relative to the case.

Embodiments disclosed herein are directed to an information handling system with an open design to facilitate convective cooling of a device positioned in the case. The information handling system comprises a bracket comprising a first plurality of openings formed in two or more arrays, wherein an area defined by the two or more arrays is less than an area of the device, wherein each opening is formed in the bracket to facilitate convective heat transfer from the device; a case having a front panel comprising a second plurality of openings formed in an array relative to the bracket positioned in the case, wherein each opening facilitates convective heat transfer from the bracket; and a bezel mounted to the front panel, wherein the bezel comprises a third plurality of openings to facilitate convective heat transfer from the case to an ambient environment. The bracket is positioned relative to the front panel such that a portion of the area of the device less than the total area of the device is visible through the first plurality of openings in the bracket, the second plurality of openings in the front panel, and the third plurality of openings in the bezel. In some embodiments, the two or more arrays of openings in the bracket comprise a first array dimensioned with a first set of rows and a first set of columns and a second array dimensioned with a second set of rows and a second set of columns, wherein the dimensions of the first array differ from the dimensions of the second array. In some embodiments, the bracket is selectively positioned relative to the case in one of at least two orientations, wherein in a first orientation, the two or more arrays are positioned relative to a first portion of the second plurality of openings in the case, wherein in a second orientation, the two or more arrays are positioned relative to a second portion of the second plurality of openings in the case. In some embodiments, the orientation of the bracket is based on a label on a device installed in the bracket, wherein the label is less visible when the bracket is positioned in the case in the first orientation than the second orientation. In some embodiments, each opening in the second plurality of openings in the case is dimensioned with a height and a width and each opening in the first plurality of openings in the bracket is dimensioned with a height and a width, wherein the dimensions of the second plurality of openings and the dimensions of the first plurality of openings are based on a distance between the bracket and the front panel. In some embodiments, each pair of openings in the first plurality of openings on the bezel is separated by a rib, wherein a depth of the rib is greater than a width of each opening in the pair of openings. In some embodiments, each opening in the second plurality of openings in the case is dimensioned with a height and a width and each opening in the first plurality of openings in the bracket is dimensioned with a height and a width, wherein the dimensions of the second plurality of openings and the dimensions of the first plurality of openings is based on the depth of the rib and the width of each opening in the bezel. In some embodiments, each rib is angled relative to the case.

Embodiments are generally directed to a chassis configurable for mounting a device in one of a plurality of positions and orientations in an information handling system. The chassis comprises a case having a front panel, a rear panel, a bottom panel and a top panel; and a bracket comprising a first set of features for coupling the bracket to the front panel of the case in a first orientation; a second set of features for coupling the bracket to the top panel of the case in a second orientation; and a plurality of bracket openings. At least one set of the first set of features and the second set of features is configured to position the plurality of bracket openings relative to a bezel in the case. In some embodiments, the plurality of bracket openings comprises an array of openings arranged in a plurality of rows and a plurality of columns. In some embodiments, the bezel comprises a plurality of bezel openings, wherein the at least one set of the first set of features and the second set of features is configured to align the plurality of bracket openings relative to the plurality of bezel openings. In some embodiments, the plurality of bezel openings comprises an array of openings arranged in a plurality of rows and a plurality of columns, wherein the plurality of bracket openings are offset from the plurality of bezel openings in at least one of a horizontal direction and a vertical direction. In some embodiments, at least one of the first set of features and the second set of features comprises a keyhole design. In some embodiments, the bracket comprises a first flange for coupling to the case in a first orientation and a second flange for coupling to the case in a second orientation.

Embodiments are generally directed to an information handling system (IHS) configurable in any of a plurality of configurations, the information handling system comprising a case having a front panel, a rear panel, a bottom panel and a top panel; and a bracket comprising a first set of features for coupling the bracket to the front panel of the case in a first orientation; a second set of features for coupling the bracket to the top panel of the case in a second orientation; and a plurality of bracket openings. At least one set of the first set of features and the second set of features is configured to position the plurality of bracket openings relative to a bezel in the case. In some embodiments, the plurality of bracket openings comprises an array of openings arranged in a plurality of rows and a plurality of columns. In some embodiments, the bezel comprises a plurality of bezel openings, wherein the at least one set of the first set of features and the second set of features is configured to align the plurality of bracket openings relative to the plurality of bezel openings. In some embodiments, the plurality of bezel openings comprises an array of openings arranged in a plurality of rows and a plurality of columns, wherein the plurality of bracket openings are offset from the plurality of bezel openings in at least one of a horizontal direction and a vertical direction. In some embodiments, the bracket comprises a first flange for coupling to the case in a first orientation and a second flange for coupling to the case in a second orientation.

In any of the disclosed embodiments, a single bracket is capable of supporting mounting of any of a variety of devices in different locations and orientations in a desktop chassis designs. Embodiments enable mounting of devices while maintaining cable management and thermal solutions in an aesthetically pleasing configuration.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) systems, such as a keyboard, a mouse, and a video display. The information handling system may also include one or more buses operable to transmit communication between the various hardware components.

A chassis for a desktop information handling system comprises a case 11 for coupling to and supporting processors, hubs, buses, cards, memory and other devices and systems for performing the functionality of the information handling system. A case 11 has a front panel 110 which typically has a power button, ports such as USB ports, and media drives such as an Optical Disk Drive (ODD) 5. In addition to the functional features, the layout of the front panel can be ornamental. The front panel 110 may be formed with a plurality of openings to allow cooling, and the plurality of openings can be arranged in an array 117 dimensioned with rows and columns of openings. The case 11 also has a rear panel with ports for network connectivity, communication with a keyboard, mouse, external monitor and other devices and systems. Typical positioning of the information handling system orients the chassis such that the rear panel is generally not visible. The case also has a top panel and a bottom panel, and two side panels. The top panel, bottom panel and side panels are generally formed as solid panels, which protect the information handling system from damage as well as obscure the internal components.

Inside the case there are boards, slots, chips, cables, fans, and other devices and components to provide a desired functionality of the information handling system. For example, the motherboard is configured to provide structural support, power, and electrical connectivity between the various components. The motherboard includes multiple connector sockets in various configurations, adapted to receive pluggable circuit cards, component chip packages, etc. A platform controller hub (PCH) or chipset via front-side bus is configured to coordinate I/O traffic between processors and other components. A PCH is coupled to graphics devices via a graphics bus (e.g., a Peripheral Component Interconnect (PCI) bus, etc.), coupled to system memory via a memory bus, one or more PCI devices (e.g., modems, network cards, sound cards, video cards, shared memory etc.) and coupled to ports, pins, and/or adapters over a bus. System memory is installed in slots to store program instructions and/or data, accessible by processors and can be implemented using any suitable memory technology, such as static RAM (SRAM), synchronous dynamic RAM (SDRAM), nonvolatile/Flash-type memory, or any other type of memory. The PCH is configured to handle various I/O operations, and the rear panel 113 typically provides PCH interfaces such as a Universal Serial Bus (USB) port, audio, serial, parallel, Ethernet, and other interfaces via ports, pins, and/or adapters. In addition to the case 11, an information handling system may include input devices, such as keyboards, keypads, touch screens, scanning devices, voice or optical recognition devices, or any other devices suitable for entering or retrieving data. Multiple I/O devices may be present in an information handling system. In some information handling systems, I/O devices may be separate from the information handling system and the information handling system may interact with the I/O devices through a wired or wireless connection. Each of these components requires power and will generate some heat, with the amount of heat generated depending on the component and how much power is supplied to the component. Furthermore, the amount of heat generated in the case will depend on the components in the case. The amount of heat in the case can affect performance and life of the components.

Figure 1:
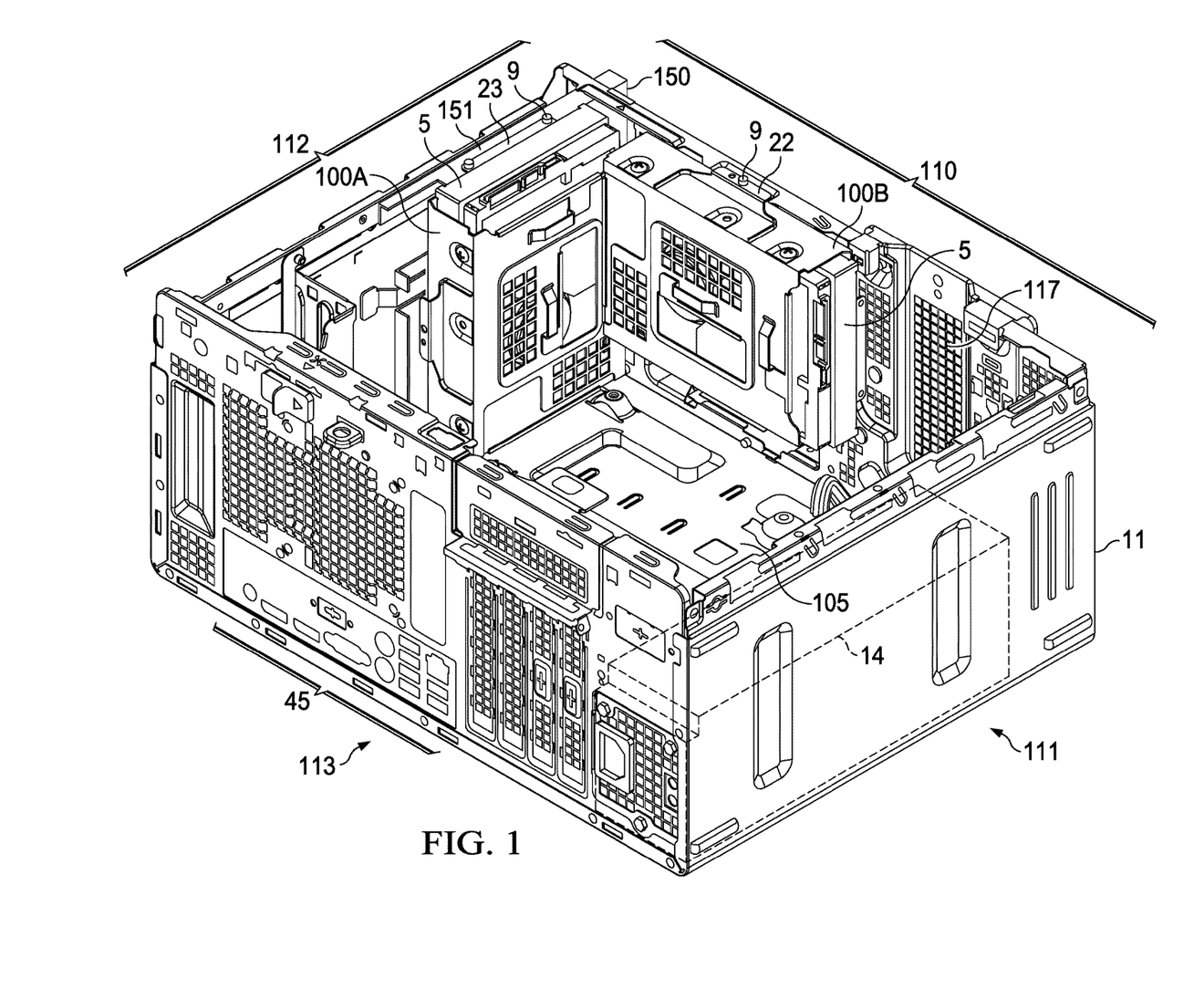
FIG. 1 depicts a perspective view of an exemplary information handling system.

To enable manufacturing of more versatile information handling systems capable of obscuring components while facilitating cooling of the case and particular components, embodiments disclosed herein use mounting brackets formed with multiple arrays of openings and configured to enable mounting in various locations and configurations in a chassis, allowing for variations in configurations and customization of functionality of an information handling system. In addition to being adapted for mounting a device relative to a plurality of openings in the case, a bracket can be installed relative to another component to offer another thermal solution for facilitating cooling and for improved space savings without increasing costs. In particular, in a case for a desktop information handling system, the location and configuration of other components can affect the position and orientation of mounting additional components. For example, FIG. 1, depicts a partial perspective view of an exemplary desktop case with motherboard 105 positioned or oriented in various configurations in the case, ODD 150 coupled to top panel 112, input for power supply 14 and I/O components such as communication ports 45. Rear panel 113 is generally not visible when the information handling system is use, so ports 45 for communication with a network, a keyboard, a mouse, a monitor and other devices and systems may be visible without affecting the aesthetics of case 11. Bottom panel 111 in FIG. 1 has feet for supporting case 11 on a surface but is generally a continuous surface due to the position of power supply 14 proximate bottom panel 111. Top panel 112 is generally a continuous surface to provide protection to components such as Optical Disk Drive (ODD) 150, motherboard 105, power supply 14, and other components and devices in case 11.

As depicted in FIG. 1, case 11 has two mounting brackets 100A, 100 installed therein according to at least one embodiment, illustrating two positions and two orientations of bracket 100. Since front panel 110 will be visible and includes a plurality of openings in an array 117 to facilitate cooling of components in case to an ambient environment, the number and size of each opening in the plurality of openings is selected based on facilitating cooling from the case to an ambient environment and the dimensions of the array are based on an ornamental design for obscuring components installed in the case.

Bracket 100A is coupled to top panel 112 in a first orientation and bracket 100B is coupled to front panel 110 in a second orientation. The position or orientation of bracket 100 is based on the position or configuration of motherboard 105 and other components such as ODD 150. Bracket 100 includes flanges 22, 23, wherein flange 22 is configured for coupling bracket 100B to front panel 110 and flange 23 is configured for coupling bracket 100A to top panel 112. In some embodiments, flange 22 or 23 is configured for coupling bracket 100 to another component or device in case 11. As depicted in FIG. 1, flange 23 of bracket 100A is coupled to device bay 151 that allows ODD 150 to be accessed without opening case 11.

Figure 2A:
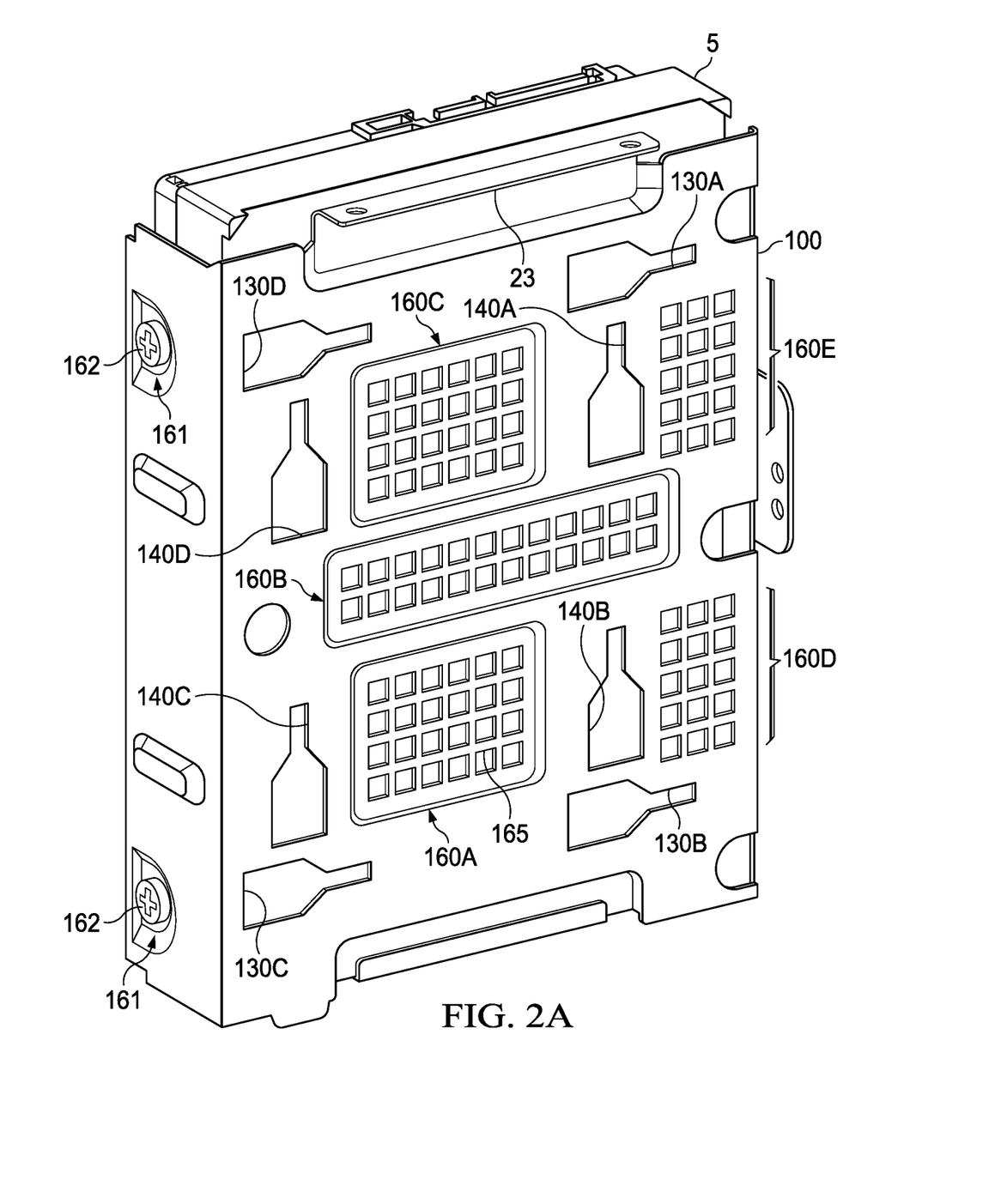
FIGS. 2A-2B depict perspective front and back views of a bracket, illustrating variations in dimensions and positioning of multiple arrays on a bracket.
Figure 2B:
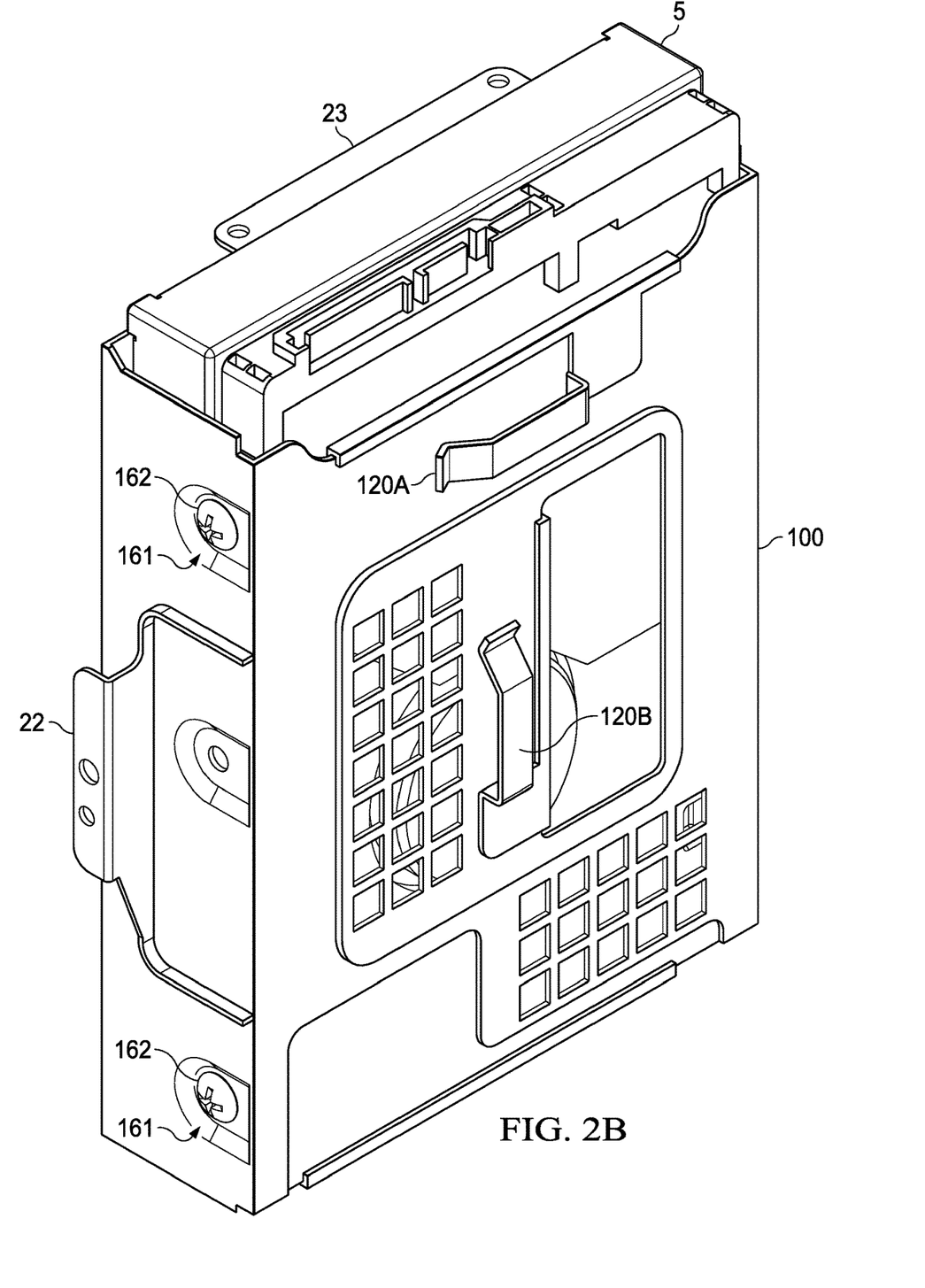

To enable mounting a device in various locations and configurations, bracket 100 is adapted with mounting features and cable retention features, wherein each set of mounting features is configured to position and orient the bracket according to an information handling system configuration and the cable retention features maintain control of cable routing through the case. FIGS. 2A and 2B depict perspective views of one embodiment of bracket 100. Bracket 100 comprises first set of mounting features 130A-130D, a second set of mounting features 140A-140D and flanges 22 and 23. Bracket 100 also comprises a plurality of openings 165 arranged in two or more arrays 160A-160E.

Bracket 100 is configured to allow tool-less installation and removal of a device such as Hard Disk Drive (HDD) 5 in any location and orientation. Mounting features 130 are configured for mounting bracket 100 to case 11 in a first orientation and at a first location. Mounting features 140 are configured for mounting bracket 100 to case 11 in a second orientation and at a second location. In some embodiments, mounting features 130, 140 are configured for tool-less installation, such as by having a tapered or keyhole design. Advantageously, mounting features 130, 140 facilitate tool-less installation, allow for adjustments to the position of bracket 100, and provide additional openings to facilitate air flowing past device 5 to allow convective heat transfer away from device 5. Bracket 100 may be mounted to case 11 in different orientations. Cable retention features 120 allow cable management for various orientations of bracket 100 and provide additional surface area to facilitate convective heat transfer.

Hardware 162 couples device 5 to bracket 100 for various positions and configurations. Recesses 161 allow bracket 100 to be positioned and configured without hardware 162 contacting other components.

Embodiments disclosed herein allow a single bracket design to support mounting a device such as an HDD in any of multiple locations and orientations within a desktop chassis.

Figure 3A:
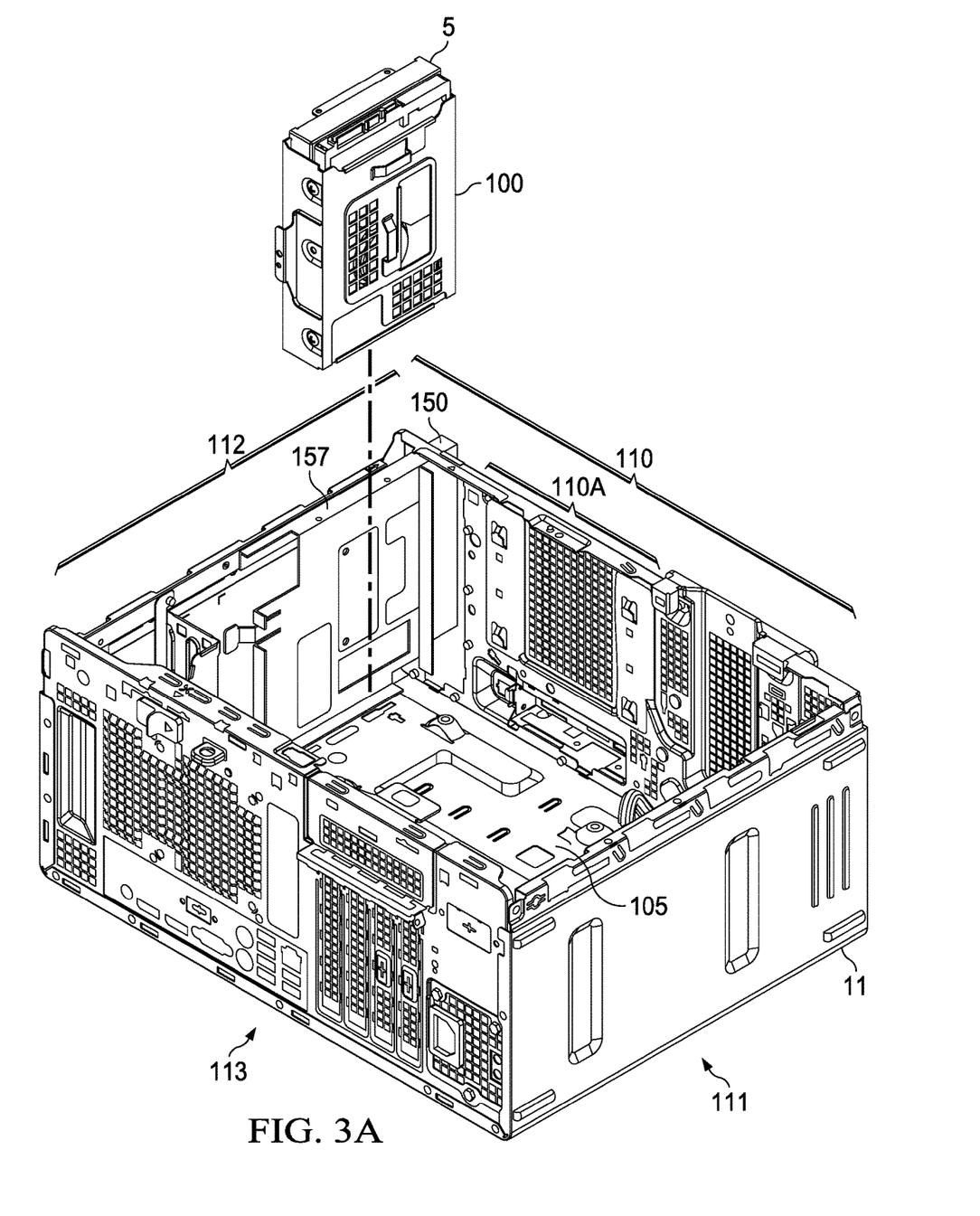
FIGS. 3A-3B depict perspective views of embodiments of a bracket for installation in a desktop computer.
Figure 3B:
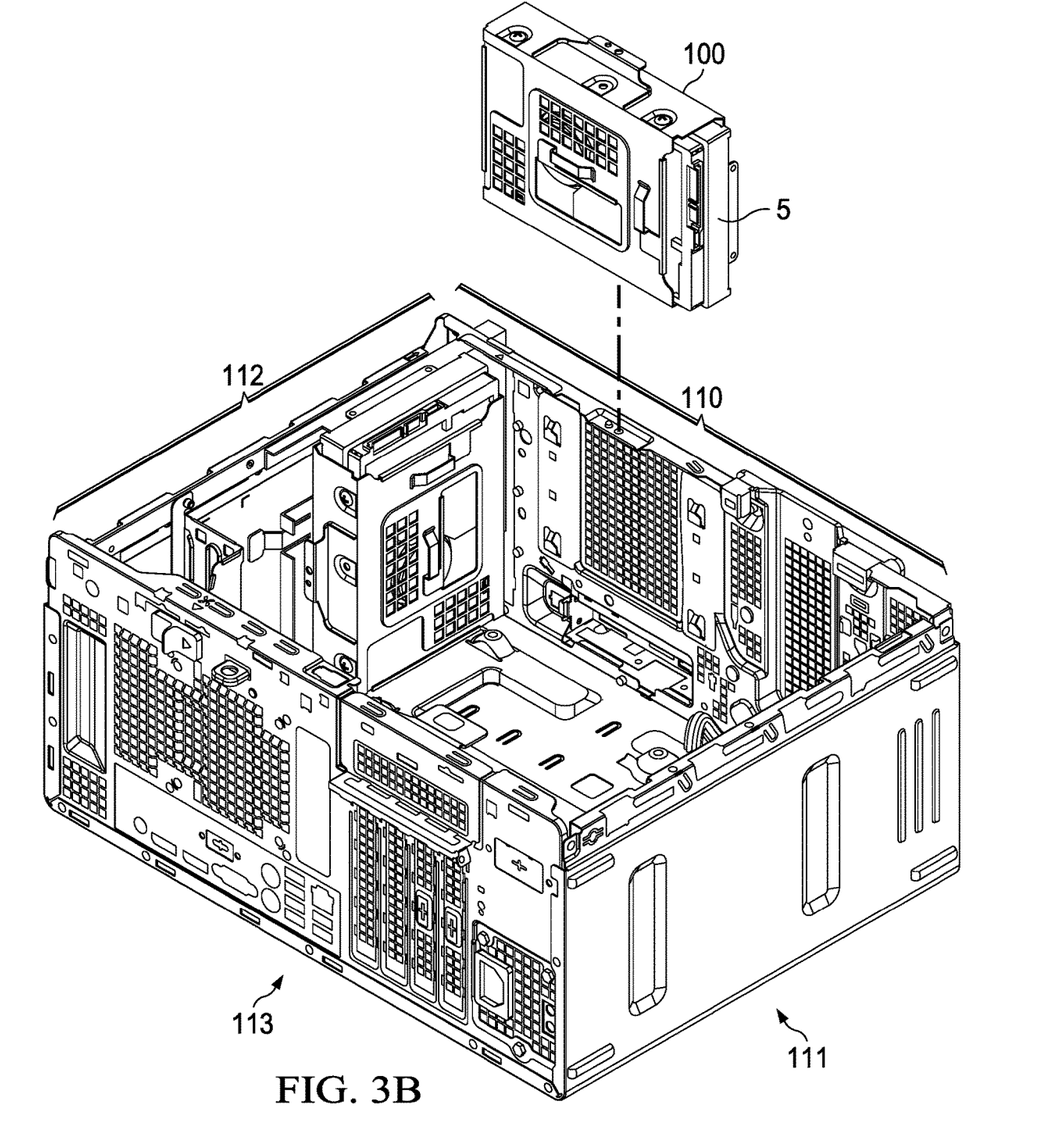

FIGS. 3A and 3B depict perspective views of a case for a desktop information handling system in which one embodiment of a bracket 100 is configured for selective positioning and orientation. A method of assembling a chassis for an information handling system includes positioning a device 5 in the bracket 100, determining an orientation of the bracket relative to an array 117 of openings formed in a portion 110A of front panel 110 based on cooling requirements and ensuring the device is not visible or at least not recognizable when visible, and installing the bracket relative to the array. If the device is to be installed proximate another device, assembling a chassis may include selecting a flange 22 or 23 for mounting the bracket the device. Determining a position and orientation of the bracket may include determining a thermal solution for the chassis and installing the bracket 100 in a position and orientation based on the thermal solution to facilitate convective heat transfer from the device to an ambient environment outside the case.

Figure 4:
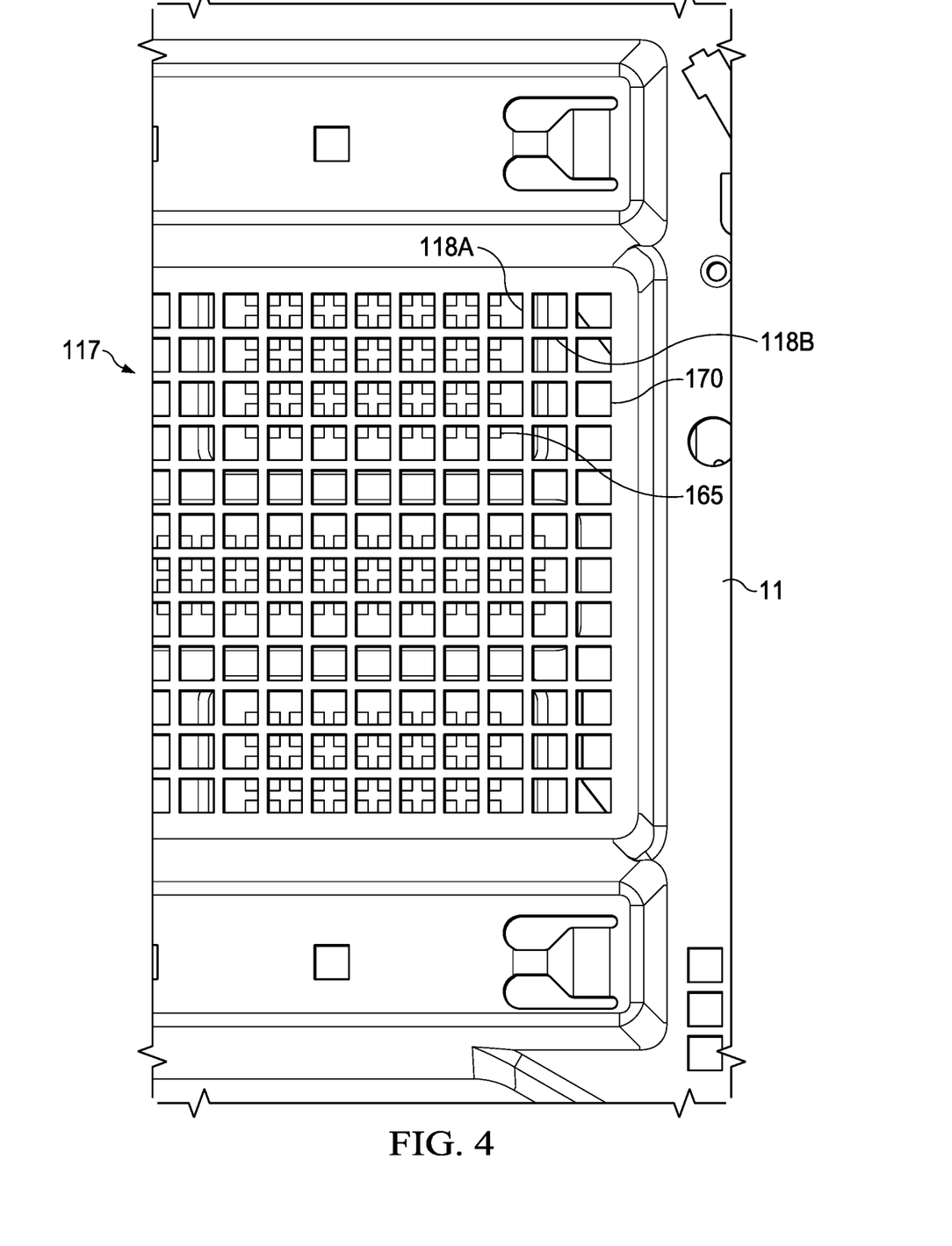
FIG. 4 depicts a partial front view of the exemplary desktop information handling system of FIG. 1 with one embodiment of a bracket installed with an array of openings offset from an array of bezel openings.

Determining a position and orientation of bracket 100 may also include installing the bracket 100 in a position and orientation based on an ornamental design of the case 11. FIG. 4 depicts a partial perspective view of one embodiment of bracket 100 coupled to case 11. In one embodiment, case 11 comprises an array 117 formed with a plurality of openings 170 in which the number, size and arrangement of the plurality of openings 170 are configured to facilitate convective heat transfer from the case 11 to an ambient environment and also obscure device 5 from viewing through the front panel 110. Bracket 100 may be coupled to case 11 in any position and orientation that allows cooling to still occur through openings 170. In some embodiments, bracket 100 is configured for positioning array 160 of bracket openings 165 relative to array 117. Positioning the two or more arrays 160 of bracket openings 165 relative to an array 117 in front panel 110 creates an appearance of a non-continuous surface to a person looking at a front view of the information handling system. In some embodiments, array 117 is dimensioned with rows and columns with each opening 170 having a height and width, with each pair of openings separated by a vertical divider 118A or a horizontal divider 118B. Dividers 118A, 118B collectively form a web. Bracket 100 is positioned in case 11 such that the plurality of bracket openings 165 and the plurality of openings 170 are oriented relative to each other to facilitate convective heat transfer through openings 165 and 170 but a device positioned in bracket 100 with bracket 100 positioned and oriented relative to case 11 including the position of vertical members 117A or horizontal members 117B is obscured from viewing through the front panel 110.

Figure 5A:
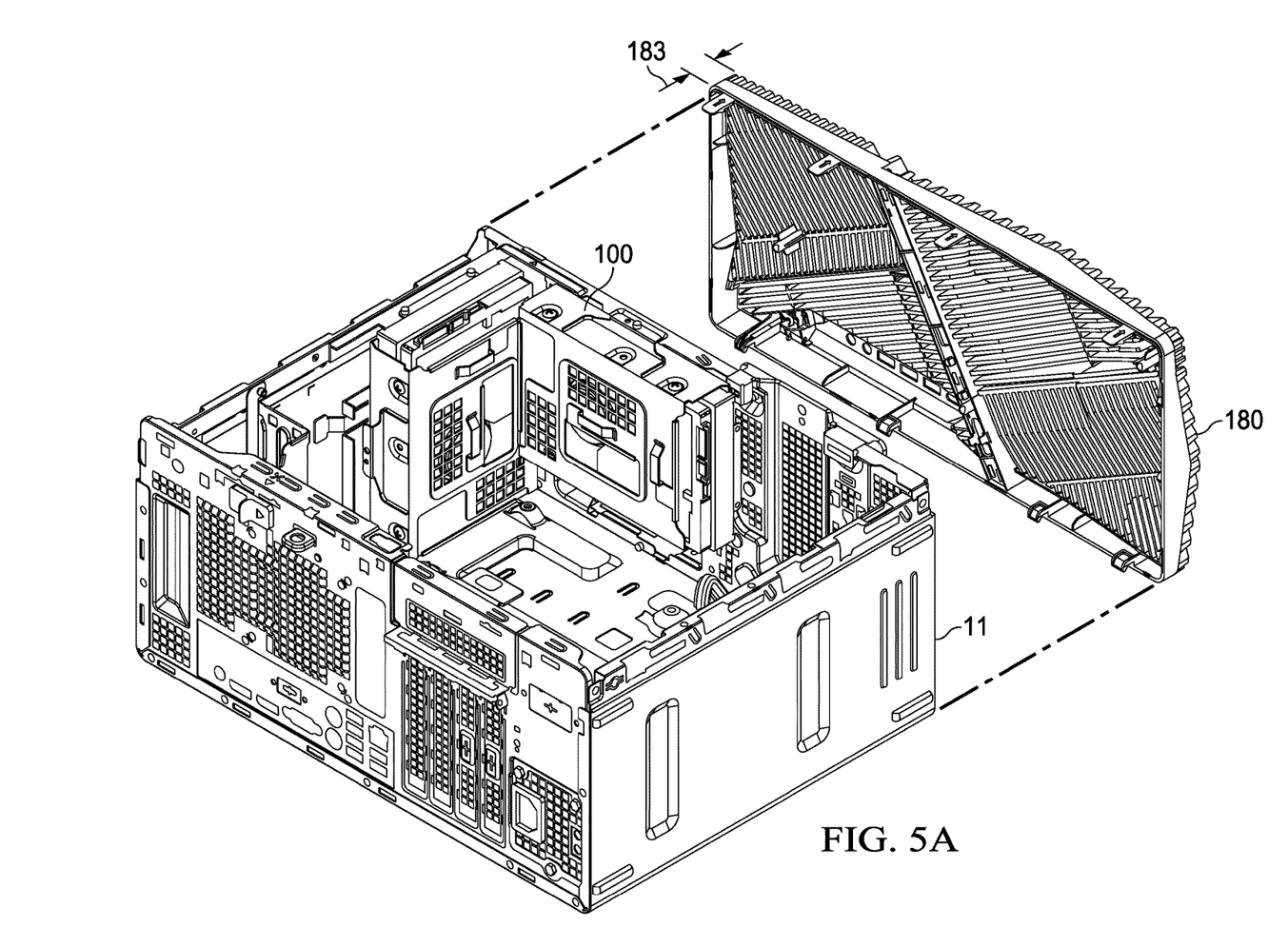
FIGS. 5A-5B depict perspective views of the exemplary desktop information handling system of FIG. 1 with one embodiment of a bezel mounted to a front panel.
Figure 5B:
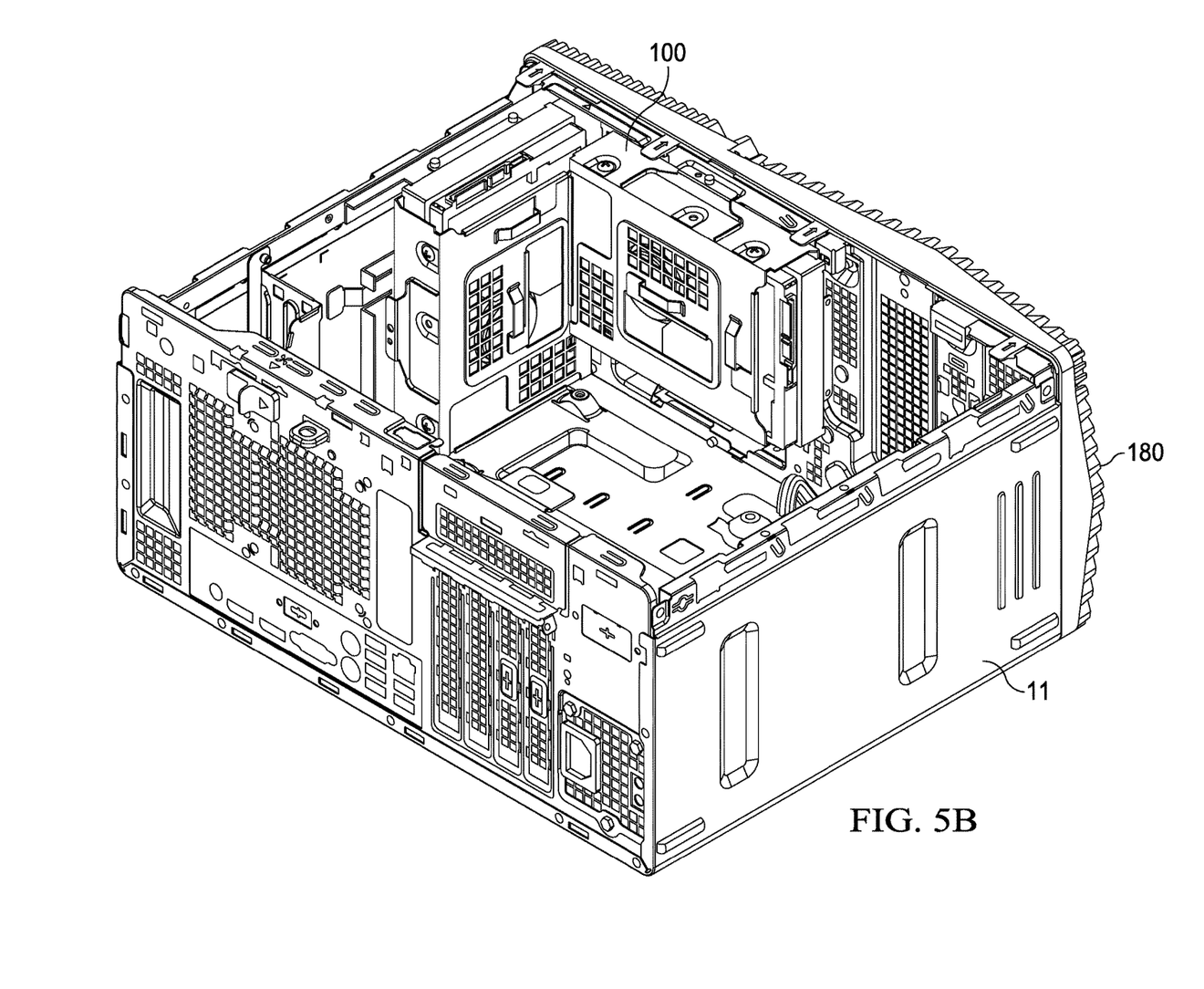

Embodiments disclosed herein include a bezel with an open design to facilitate cooling and further obscure device 5 when case 11 is seen from a front view. FIGS. 5A and 5B depict perspective views of case 11 and bezel 180. Bezel 180 has depth 183 and is generally formed with ribs 181 separated by vents 182. Each rib 181 has a thickness based on the depth 183 of bezel 180 and an angle of rib 181. The depth 183 of bezel 180 can vary across the width and height of bezel 180. Thus, a thickness of rib 181 can vary across the width and height of bezel 180. Vents 182 formed in bezel 180 facilitate convective heat transfer from case 11 to an ambient environment. Accordingly, the dimensions of vents 182 formed in bezel 180 are based on allowing heat transfer out of case 11 and ensuring bezel 180 obscures device 5 from a front view of case 11.

Figure 6:
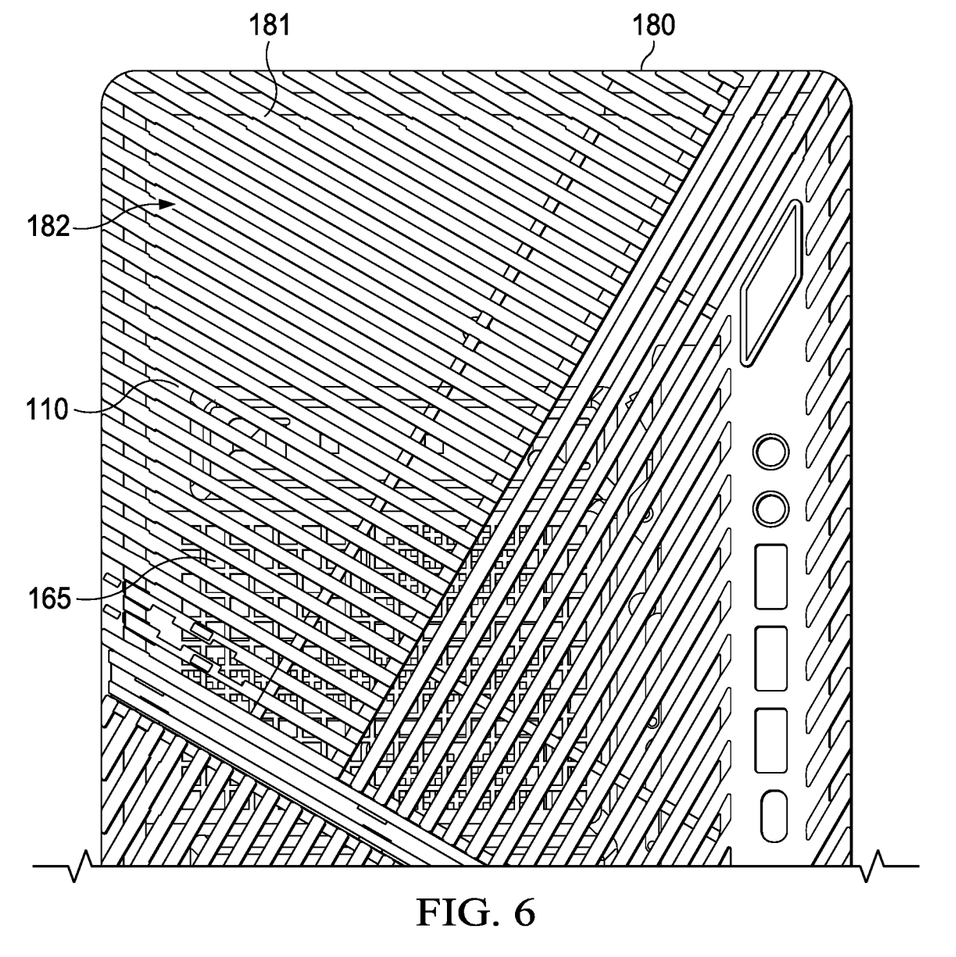
FIG. 6 depicts a front view of the exemplary desktop information handling system of FIG. 1 with one embodiment of bezel mounted thereto.

FIG. 6 depicts a front view of case 11 with device 5 mounted in bracket 100, which is mounted to case 11, which has bezel 180 positioned in front. In some embodiments, one or more of the shape, size and angle of vents 182 is determined based on convective heat transfer and ensuring device 5, bracket 100 or front panel 110 of case 11 is obscured from view. Advantageously, embodiments disclosed herein facilitate convective heat transfer from a device mounted in bracket 100 through front panel 110 and bezel 180 to an ambient environment, while obscuring the device from viewing through the bezel. Those skilled in the art will appreciate that the depth of bezel 180, the angle and size of ribs 181 on bezel 180, the number and size of openings in front panel 110, the number and size of openings in bracket 100, and the orientation of openings 165, 117 (including the orientation of arrays 117) relative to bezel 180, effectively obscure device 5 from view and present a uniform appearance for all information handling systems with the same or different components, installed in the same or different configuration, while still facilitating convective heat transfer from the device to an ambient environment.

A person of ordinary skill in the art will appreciate that the desktop information handling system depicted in the accompanying figures is merely illustrative and is not intended to limit the scope of the disclosure described herein. Any computer system and/or device may include any combination of hardware or software capable of performing certain operations described herein. For instance, although the desktop information handling system is depicted with the bracket installed at the top of the front panel or the front of the top, various systems and methods described herein may be adapted for other configurations.

In other implementations, one or more of the devices or components depicted with respect to the information handling system may be absent, or one or more other components may be added. Accordingly, systems and methods described herein may be implemented or executed with other computer system configurations.

Aspects of the present disclosure are described above with reference to components, systems and methods of manufacture according to embodiments of the disclosure. It will be understood by those of skill in the art, that certain steps and processes may be implemented in a different order and/or using different methods without departing in scope of the concepts.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a system, device or component thereof to the teachings of the disclosure without departing from the essential scope thereof. Therefore, it is intended that the disclosure not be limited to the embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for describing embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A system for cooling a device while obscuring the device behind a bezel mounted to a case of an information handling system, wherein the bezel comprises an open design defined by a first plurality of openings to facilitate convective heat transfer from the case to an ambient environment, the system comprising:
   a front panel of the case having a second plurality of openings formed in an array relative to a heat source, wherein each opening of the second plurality of openings facilitates the convective heat transfer from the case; and
   a bracket comprising a third plurality of openings formed in two or more arrays, wherein an area defined by the two or more arrays of the third plurality of openings is less than a total area of the device, wherein each opening of the third plurality of openings is formed in the bracket to facilitate convective heat transfer from the device,
   wherein the bracket is positioned relative to the front panel such that a portion of the area of the device less than the total area of the device is visible through the third plurality of openings in the bracket, the second plurality of openings in the front panel, and the first plurality of openings in the bezel, and
   wherein the third plurality of openings in the bracket, the second plurality of openings in the front panel of the case and the first plurality of openings in the bezel facilitate the convective heat transfer from the device to the ambient environment.

2. The system of claim 1, wherein:
   the two or more arrays of the third plurality of openings in the bracket comprise a first array of the third plurality of openings dimensioned with a first set of rows and a first set of columns and a second array of the third plurality of openings dimensioned with a second set of rows and a second set of columns, wherein the dimensions of the first array of the third plurality of openings differ from the dimensions of the second array of the third plurality of openings.

3. The system of claim 2, wherein:
   the bracket is selectively positioned relative to the case in one of at least two orientations, wherein in a first orientation, the two or more arrays of the third plurality of openings are positioned relative to a first portion of the second plurality of openings in the case, wherein in a second orientation, the two or more arrays of the third plurality of openings are positioned relative to a second portion of the second plurality of openings in the case.

4. The system of claim 3, wherein:
   the orientation of the bracket is based on the device installed in the bracket, wherein the device is less visible when the bracket is positioned in the case in the first orientation than the second orientation.

5. The system of claim 1, wherein:
   each opening of the second plurality of openings is dimensioned with a height and a width; and each opening of the third plurality of openings is dimensioned with a height and a width, wherein the dimensions of each opening of the second plurality of openings and the dimensions of each opening of the third plurality of openings are based on a distance between the bracket and the front panel.

6. The system of claim 1, wherein:

each pair of openings in the first plurality of openings is separated by a rib, wherein a depth of the rib is greater than a width of each opening in the pair of openings of the first plurality of openings.

7. The system of claim 6, wherein:

each opening of the second plurality of openings is dimensioned with a height and a width; and each opening of the third plurality of openings is dimensioned with a height and a width, wherein the dimensions of each opening of the second plurality of openings and the dimensions of each opening of the third plurality of openings is based on the depth of the rib and the width of each opening of the first plurality of openings.

8. The system of claim 6, wherein the rib is angled relative to the case.

9. An information handling system with an open design to facilitate convective cooling of a device positioned in a case, the information handling system comprising:

a bracket comprising a first plurality of openings formed in two or more arrays, wherein an area defined by the two or more arrays of the first plurality of openings is less than a total area of the device, wherein each opening of the first plurality of openings is formed in the bracket to facilitate the convective cooling of the device, the case having a front panel comprising a second plurality of openings formed in an array relative to the bracket positioned in the case, wherein each opening of the second plurality of openings facilitates the convective cooling of the device;

a bezel mounted to the front panel, wherein the bezel comprises a third plurality of openings to facilitate the convective cooling of the device;

wherein the bracket is positioned relative to the front panel such that a portion of the area of the device less than the total area of the device is visible through the first plurality of openings in the bracket, the second plurality of openings in the front panel, and the third plurality of openings in the bezel.

10. The information handling system of claim 9, wherein:

the two or more arrays of the first plurality of openings in the bracket comprise a first array of the first plurality of openings dimensioned with a first set of rows and a first set of columns and a second array of the first plurality of openings dimensioned with a second set of rows and a second set of columns, wherein the dimensions of the first array of the first plurality of openings differ from the dimensions of the second array of the first plurality of openings.

11. The information handling system of claim 10, wherein:

the bracket is selectively positioned relative to the case in one of at least two orientations, wherein in a first orientation, the two or more arrays of the first plurality of openings are positioned relative to a first portion of the second plurality of openings in the case, wherein in a second orientation, the two or more arrays of the first plurality of openings are positioned relative to a second portion of the second plurality of openings in the case.

12. The information handling system of claim 11, wherein:

the orientation of the bracket is based on the device installed in the bracket, wherein the device is less visible when the bracket is positioned in the case in the first orientation than the second orientation.

13. The information handling system of claim 9, wherein:

each opening of the second plurality of openings in the case is dimensioned with a height and a width; and each opening of the first plurality of openings in the bracket is dimensioned with a height and a width, wherein the dimensions of each opening of the second plurality of openings and the dimensions of each opening of the first plurality of openings are based on a distance between the bracket and the front panel.

14. The information handling system of claim 9, wherein:

each pair of openings in the third plurality of openings on the bezel is separated by a rib, wherein a depth of the rib is greater than a width of each opening in the pair of openings of the third plurality of openings.

15. The information handling system of claim 14, wherein:

each opening of the second plurality of openings in the case is dimensioned with a height and a width; and each opening of the first plurality of openings in the bracket is dimensioned with a height and a width, wherein the dimensions of each opening of the second plurality of openings and the dimensions of each opening of the first plurality of openings is based on the depth of the rib and the width of each opening of the third plurality of openings in the bezel.

16. The information handling system of claim 14, wherein the rib is angled relative to the case.

* * * * *